Figure 9:
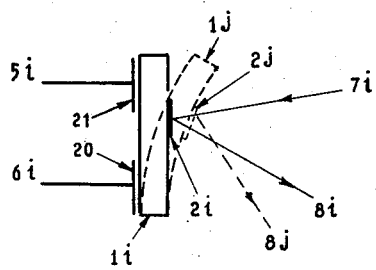

Jan. 12, 1960     R. BLYTHE     2,920,529
ELECTRONIC CONTROL OF OPTICAL AND NEAR-OPTICAL RADIATION
Filed May 23, 1952     3 Sheets-Sheet 1
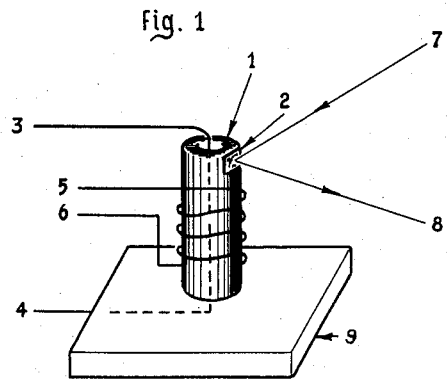
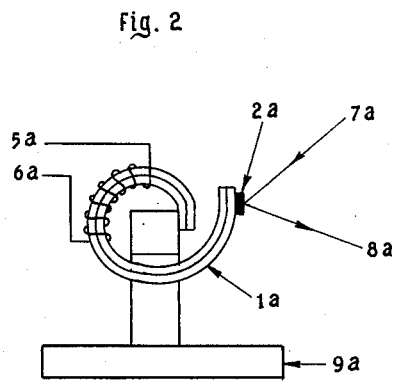
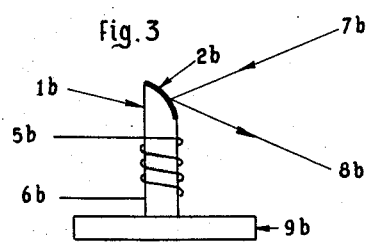
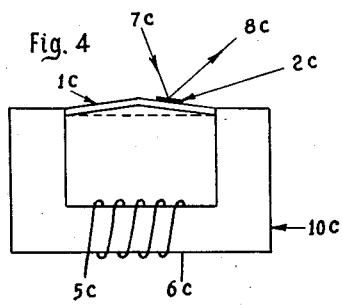
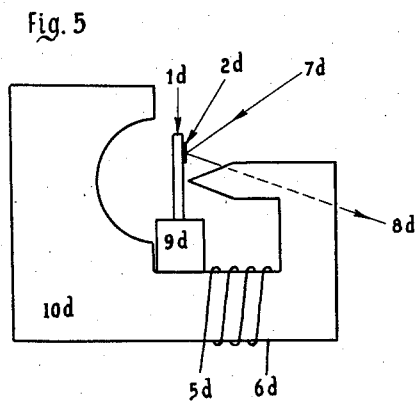
Inventor:
Richard Blythe
by *Arthur M. Smith*
His Attorney Jan. 12, 1960          R. BLYTHE          2,920,529
ELECTRONIC CONTROL OF OPTICAL AND NEAR-OPTICAL RADIATION
Filed May 23, 1952          3 Sheets-Sheet 2
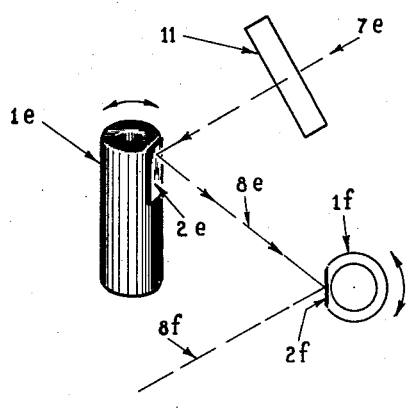
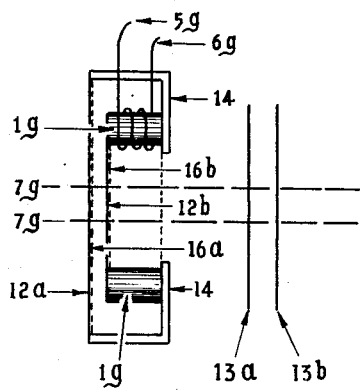
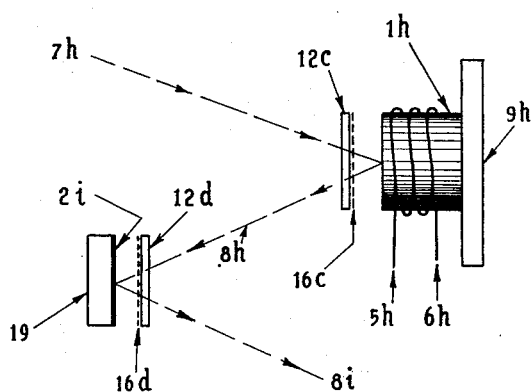
Inventor:
Richard Blythe
by Arthur N. Smith
His Attorney Inventor:
Richard Blythe
His Attorney United States Patent Office 2,920,529
Patented Jan. 12, 1960

2,920,529

ELECTRONIC CONTROL OF OPTICAL AND NEAR-OPTICAL RADIATION

Richard Blythe, Ann Arbor, Mich.

Application May 23, 1952, Serial No. 289,693

1 Claim. (Cl. 88—73)

The present invention relates to apparatus for controlling the angular direction of light rays, and for changing the pass band of optical filters by electrostrictive and magnetostrictive methods.

For purposes of the present application, the term "light rays" is used in a generic sense to include primarily the optical and near-optical radiations of the electro-magnetic spectrum in which it has numerous preferred embodiments. The present invention is not thereby to be expressly limited to uses within such radiation ranges.

The word "strictive" as used herein is a generic term which embodies the terms "magnetostrictive" and "electrostrictive."

It is broadly an object of the present invention to provide a method for controlling light rays which includes subjecting such light rays to a control element which is affixed to a strictive element and subjecting the strictive element to an energy field so that said strictive element varies its position in accordance with the energy field, the control element being moved accordingly to vary the control of the light rays.

It is another object of the present invention to provide a device for controlling light rays which includes a strictive element coupled to a source of electrical energy and a control element affixed to said strictive element, the light rays engaging said control element being regulated by the position of the strictive element as determined by the source of electrical energy.

It is a further object of the present invention to provide a method for varying the pass band of an optical filter and a device for carrying out the said method, which includes passing light rays through a filter medium and varying the position of the filter medium by subjecting a strictive element, which is affixed to the filter medium, to a field of energy. Thus, the position of the filter medium is varied in accordance with the movement of the strictive element which movement is controlled by the field of energy.

It is another object of the present invention to provide a device for varying the angular deflection of light rays by deflecting surfaces disposed at an angle one to the other, said deflection being controlled by the movement of a strictive element coupled with a source of electrical energy.

Other objects of this invention will appear in the following description and appended claims, reference being had to the accompanying drawings forming a part of this specification wherein like reference characters designate corresponding parts in the several views.

The features of this invention which are believed to be novel and patentable will be pointed out in the claim appended hereto. For a better understanding of this invention, reference is made in the following description to the accompanying drawings.

Figure 10:
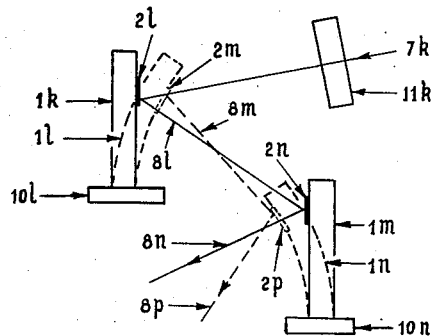
Figure 11:
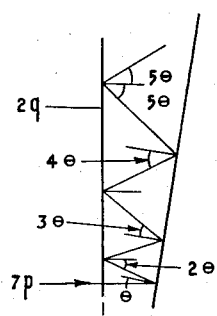
Figure 12:
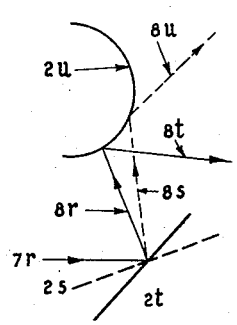
Figure 13:
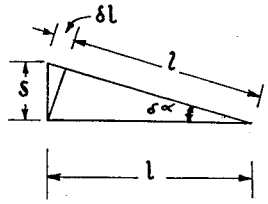
Figure 14:
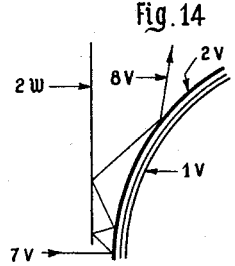

In the drawings:

Figures 1, 2, 3, 4 and 5 represent schematic views of various types of magnetostrictive apparatus for varying the deflection angle of light rays as discussed in this application. Fig. 6 is a schematic diagram indicating one of the possible methods of causing the deflected light ray to sweep over a desired area or in a desired pattern. Fig. 7 indicates a type of variable frequency optical transmission filter. Fig. 8 indicates a type of variable frequency optical reflection filter. Fig. 9 represents a schematic diagram of one of the possible types of electrostrictive apparatus for varying the deflection angle of light rays. Fig. 10 represents another possible method of causing the deflected light ray to sweep over a desired area or in a desired pattern. Figures 11 and 12 are explanatory diagrams showing methods of increasing the angular deviation of a light ray. Fig. 13 is an explanatory diagram used in calculating the effect taking place in Fig. 4. Fig. 14 is another possible type of apparatus for varying the deflection angle of light rays.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to Fig. 1, a tube of magnetostrictive material designated by 1 is surrounded by coil winding 5—6 and has coil windings 3—4 passing longitudinally through its center. The whole apparatus is supported on a stand 9. A mirror or mirror surface 2 is affixed to the material 1 such that a ray of light 7 incident upon this mirror from any desired direction will be reflected in another direction 8 according to the laws of optics. Current through coil 5—6 sets up a longitudinal magnetic field in tube 1 while current through coil 3—4 sets up a circular magnetic field. The superposition of these fields in the material gives rise to a resultant helical field which causes the tube 1 to twist according to the known phenomena of magnetostriction. This twist causes mirror surface 2 to present a slightly different aspect to a fixed incoming ray 7, and this causes the angle at which ray 8 is reflected to vary according to the currents in coils 3—4 and/or 5—6.

If then, say, an electronic sweep voltage is connected to coils 3—4 and/or 5—6, the light ray 8 will be deflected in angle proportional to the current at the given instant. Since the magnetostrictive effect occurs as steady state or transient phenomena at frequencies up to the multi-megacycle region for properly designed pieces, a combination of the deflection units, such as is described later and indicated in Fig. 6, can be used for television or other general display purposes.

The selection of the particular type of electronic circuit necessary to give the desired optical response using a particular type of strictive element can be made readily by those skilled in the art by experimental or mathematical techniques. In some instances it may be desirable to tailor the shape of the input wave to produce the desired result while in other instances it may be desirable to balance the circuit in such a manner that the output wave form would possess the desired relationship to the input wave form and give the desired characteristics with respect to the ultimate optical effect to be achieved.

Fig. 2 is a schematic indication of another type of ray deflection apparatus in which 1a is preferably a bimetal strip of magnetostrictive elements but may be a single magnetostrictive element wound in spiral or helical form. This element is affixed to support 9a and has mirror surface 2a and is surrounded by coil winding 5a—6a as before. Light beam 7a is reflected from mirror 2a in direction 8a in accordance with the laws of optics. When currents exist in coil 5a—6a, magnetostrictive element 1a expands or contracts according to the metal being used. Thus, mirror 2a is displaced which causes reflected ray 8a to be angularly displaced.

If the magnetostrictive element 1a is composed of a pair of strips bonded together in a bimetallic element as shown in Fig. 2, greater displacement is produced if these strips are so chosen as to have opposite magnetostrictive effects, such as the inner strip lengthening and the outer one shortening for the same magnetic field.

Fig. 3 is a schematic indication of another type of ray deflection apparatus in which 1b is a magnetostrictive rod affixed to base 9b. The length of the rod is caused to change by the magnetostrictive effect of the magnetic field of the current in coil 5b—6b. This causes ray 7b to be reflected from different aspects of curved mirror 2b, and thus reflected ray 8b comes off in different angular directions in accordance with known optical reflection principles.

Fig. 4 is a schematic indication of another type of ray deflection apparatus in which 1c is a fiber of magnetostrictive material supported in a magnetic yoke 10c. The magnetic field of the current in coil 5c—6c causes a corresponding expansion or contraction of the fiber 1c. This causes a flexure of the fiber, thus changing the aspect which mirror 2c presents to incoming ray 7c. As a result, reflected ray 8c goes off in a different angular direction, depending upon the flexure of the fiber 1c.

Fig. 13 gives an indication of the order of magnitude of this fiber flexure. In dealing with small angular deviations such as are involved in the present invention, the differences between movement in an arc and in a straight line will not be significant for practical purposes. Thus in preparing the schematic diagram of Fig. 13, the path of movement of an end of the strictive element is shown as being a straight line and the formulae derived therefrom which are generally explanatory of the result are accurate within the limits likely to be encountered in practice. If the magnetic field used causes a change in length per unit length of nickel $$\frac{\delta L}{L} = 5 \times 10^{-5}$$

then the change in angle of the fiber from a nearly straight line is $$\delta \alpha = \frac{\delta L}{S} = \frac{S}{L}$$

and $$S = (L \cdot \delta L)^{\frac{1}{2}}$$

Hence $$\delta \alpha = \left(\frac{\delta L}{L}\right)^{\frac{1}{2}}$$

Substituting the numerical value:

$$\delta \alpha = (50 \times 10^{-6})^{\frac{1}{2}} \cong 7 \times 10^{-3} \text{ radians}$$
$$= 0.36°$$

Referring again to Fig. 4, if the yoke 10c and fiber 1c be chosen to have oppositely directed coefficients of expansion, the magnitude of the fiber deflection will then be proportional to both effects. Fig. 5 is a schematic indication of yet another type of ray deflection apparatus in which 1d is a small strip of magnetostrictive material supported on base 9d in the highly inhomogeneous magnetic field of magnetic yoke 10d. This magnetic field is set up by current in windings 5d—6d. Light ray 7d impinges on mirror 2d which is attached to the magnetostrictive material 1d, and is reflected in direction 8d in accordance with the laws of optics. The inhomogeneous field causes strip 1d to bend, thus causing mirror 2d to present a different aspect to ray 7d. This causes reflected ray 8d to go off in a different angular direction.

It can be seen from Fig. 5 that the shape of the yoke 10d is such as to focus the magnetic field upon the strip 1d. That is, one portion of the yoke 10d adjacent the strip 1d terminates in a pointed finger directed at the strip 1d while the portion of the yoke directly opposite thereto is provided with a concave depression with the point of focus thereof directed at the said strip 1d. This construction results in a certain amplification of the otherwise normal magnetic field produced in the yoke 10d by virtue of the focusing of the field on strip 1d.

Fig. 6 is a schematic representation in perspective of a combination of two of the ray deflection devices by means of which a ray of light can be caused to cover a screen in a desired pattern. For illustrative purposes, a standard vertically oriented Cartesian coordinate system is chosen for the deflection, but it is to be understood that any desired reference system may be used. Consider incoming ray 7e. It passes through light valve and/or color filter 11, which will be discussed in connection with Fig. 7. Incoming ray 7e then impinges upon mirror 2e affixed to magnetostrictive element 1e. Element 1e has its axis of rotation oriented vertically so that ray 8e is reflected in the horizontal plane at an angle which varies according to the magnetostrictive rotation of element 1e. Ray 8e then impinges upon mirror 2f affixed to magnetostrictive element 1f whose axis of rotation is horizontal. Final reflected ray 8f thus has its angular direction in a vertical plane controlled by the rotation of element 1f, and its direction in the horizontal plane controlled, as just described, by the rotation of element 1e. In this manner, by causing rotation of elements 1e and 1f magnetostrictively as discussed in connection with Fig. 1, a ray of light may be caused to scan any desired portion of a screen area. This, in connection with the light valve and/or color filter 11, permits the sensing and reproduction of many kinds of intelligence in various forms.

It is to be understood that magnetostrictive units 1e and 1f have had the coil windings omitted for clarity, and are merely representations of any of the devices in Figs. 1 through 5 and Fig. 14 or any similar devices for changing the direction of a ray of light or near optical radiation by magnetostrictive methods.

Fig. 7 represents a schematic diagram of a cross section of a controllable frequency type optical transmission filter. It has been previously shown that two semitransparent films of the proper optical impedance, separated by a given small distance, can act as a filter. This filter passes a band of optical radiation which may be as little as 100 angstrom units in width. The center frequency $\nu_0$ is related to the film separation as follows:

$$\nu_0 = \frac{V}{2S_0}$$

where $S_0$ = separation of the films
$\nu_0$ = center frequency of the transmitted frequency band
$V$ = velocity of light in the medium between the two films.

Referring to Fig. 7, 16a and 16b are semi-transparent films on backing plates 12a and 12b respectively. 12a is affixed to one side of cylindrical support 14. The magnetostrictive elements 1g are fastened on one end to the annular ring section of supports 14 and on the other end to backing plate 12b. Current in coil elements 5g—6g sets up a magnetic field causing magnetostrictive elements 1g to change in length. This causes the separation between the semi-transparent films 16a and 16b to vary, thus causing different frequencies of light to pass through the two films proportional to the current in coils 5g—6g, and in accordance with the last equation.

Further, if 13a and 13b are two semi-transparent films separated by a fixed distance, thus forming a filter with fixed pass band, proper changes of current in coils 5g—6g can cause the optical pass band of the variable filter 16a—16b to coincide with or be different from that of the fixed filter 13a—13b. By this means, a high speed optical shutter action can be obtained by causing light rays 7g to go through the two filters in sequence, the light going through when the pass bands coincide, and being cut off when the pass bands differ.

Fig. 8 represents a schematic diagram of a reflection type interference filter, valve, or shutter. Light ray 7h passes through a semi-transparent film 16c having the proper optical impedance. This film is on backing plate 12c. The light is reflected from a mirror surface on the end of magnetostrictive element 1h and back out through elements 16c and 12c. Current in coil 5h—6h causes the distance between the semi-transparent film and the mirror surface to vary, thus causing different optical frequencies to be passed. 9h is a backing plate for 1h.

If this unit is to be used as an optical shutter, a second reflection type interference filter is placed in the system such that light ray 8h reflected from the variable filter will pass through backing plate 12d, semi-transparent surface 16d, and be reflected from mirror 2i on mount 19 back through 16d and 12d. If the pass bands of the two reflection interference filters coincide, ray 8i will pass out of the system, but if current in 5h—6h causes the variable type reflection interference filter to have a different pass band than that of the fixed filter, no light will pass through both of them in sequence.

Fig. 9 represents a schematic diagram of one type of electrostrictive ray deflection device. The undeflected shape of an electrostrictive crystal, such as for instance a Rochelle salt crystal, is shown by 1i, where 2i is a mirror surface and 5i and 6i are the leads to electrodes 21 and 20 respectively. An incoming ray of light 7i is reflected from mirror 2i in direction 8i in accordance with the laws of optics. If a high voltage be placed on electrodes 20 and 21, crystal 1i will be deformed into shape 1j, causing the mirror to appear at 2j and thus deflecting the light beam at a new angle along direction 8j.

It is to be understood that various other electrode, crystal, and mirror configurations can be used to carry out this invention and that Fig. 9 is intended to give merely an indication of the general scheme.

Fig. 10 is a schematic diagram of an electrostrictive method of causing a modulated light beam to sweep over a given screen area in any desired manner. This figure is analogous to Fig. 6 in that deflecting unit 1k has its axis of flexure at right angles to the axis of flexure of 1m. Incoming light rays 7k passes through filter 11k as it did in Fig. 6, reflects off mirror 2L, passes along 8L to mirror 2h, thence is reflected in a plane at right angles to the plane formed by 7k and 8L and proceeds out along direction 8n. 10L and 10n are the crystal supports. The electrodes 20 and 21 are omitted for clarity. When voltage is applied to the crystals, they bend electrostrictively to the dotted positions 1L and 1n. The ray 7k then is reflected in a new direction 8m from mirror 2m, strikes mirror position 2p and proceeds in a plane at right angles to the plane formed by 7r—8m and along direction 8p.

Fig. 11 shows a schematic diagram for increasing the angular deflection of a light ray. Two mirror surfaces are at an angle θ with each other with their reflecting surfaces facing each other. Ray 7p reflects off one mirror at angle θ, off the next mirror surface at angle 2θ, and proceeds by multiple reflection, increasing the angle of each reflection. If now one or both mirror surfaces move in angle, it can be seen that a very small angular motion of the mirrors, caused by either electro- or magnetostriction, can produce a much multiplied angular deviation after several reflections.

Fig. 12 shows another device for increasing or controlling the type of deflection of a light ray. Ray 7r strikes mirror 2t, is reflected along direction 8r, strikes mirror 2u, and proceeds finally along direction 8t. If the aspect of mirror 2t is changed to 2s by electrostriction or magnetostriction or otherwise, the ray will be reflected along direction 8s, strike 2u at a much different angle of incidence, and proceeds in final direction 8u.

Mirror 2u can have any shape necessary in order to control the type of angular deviation in a desired fashion.

Fig. 14 is a practical embodiment of the two facing mirror angle multipliers of Fig. 11. 1v is any strictive device having a flexured distortion. For purposes of illustration we will assume it to be a bimetallic strip of magnetostrictive materials coated with mirror 2v. The coils are not shown for the sake of simplicity. Incoming ray 7v reflects off mirror 2v to 2w, is reflected to 2v again, and after several reflections, proceeds off in direction 8v. Thus a small flexure of an electrostrictive or magnetostrictive element can give rise to a large controllable angular deviation of a light ray.

A further device of interest is made by using any of the various ray deflecting devices as an optical shutter or valve. If a ray deflecting device such as that shown in Fig. 1 is put into an optical system such as a mirror, and the reflected ray is caused to go through an aperture of any desired type, current through the deflecting device can cause it to change the direction of the reflected ray so that the ray will not go through the aforementioned aperture. This, then, becomes a shuttering or valving action.

In general, the magnetostrictive elements have electrostrictive analogs and vice versa, and the discussions herein are not intended to be limited to either individual case.

In addition, while mirror optics were used throughout for the sake of simplicity, lenses and prisms may in most cases be substituted for the mirrors in manners well known to the science of optics.

It is possible to use the principles embodied in this invention for a great diversity of purposes. A brief survey of these uses follows, but it is not intended that this list should be a limitation on this invention. Some uses are:

Advertising, color control, automatic color matching, color placement, pyrometers, automatic pattern following, data sensing, automatic spectrophotometry, telephoto, telescribing, telemetering, automatic sorting and counting, information seekers, computation devices, comparison mechanisms, display devices, meters, alignment mechanisms, weighing devices, signalling devices, high speed shutters, scanning devices, general control devices, image devices, oscilloscopes, television transmitting and receiving aids, frequency changing and wave form producing devices, and many more.

It is understood that the different properties and characteristics of the material used for the magnetostrictive or electrostrictive elements will vary over a wide range and that the specific properties of any chosen element can be determined experimentally. In forming the strictive element, the hysteresis, temperature coefficient, and frequency and resonance characteristics must be considered. Once these properties have been determined for a particular element, the control of the system using any such strictive element can be effected by those skilled in the art to assure the desired repetitive functions of the strictive element. Methods and devices for effecting such control may include among other controls, varying the applied wave form pattern or frequency, the use of temperature control devices for maintaining a temperature within a pre-selected range, mechanical or other adjustments of the elements to compensate for temperature variations, impedance control devices, damping control devices, or the like.

Having thus described my invention, I claim:

A device for controlling the direction of light rays comprising a substantially C-shaped yoke portion of magnetostrictive material having a back portion with two spaced apart substantially parallel legs depending therefrom, a strip of magnetostrictive material extending between and affixed to said legs, a light deflecting surface disposed on said strip and a coil of wire wrapped around the back portion of said yoke portion and connected to a source of electrical energy; said strip portion having a positive coefficient of expansion and said yoke portion having a negative coefficient of expansion whereby when said yoke and said strip are subjected to the magnetic field produced by said coil said legs of said yoke tend to move closer together and said strip tends to expand thereby producing a flexing of said strip; and said light deflecting surface being affixed to said strip to one side of the point of flexing of said strip.

References Cited in the file of this patent

UNITED STATES PATENTS

| | | |
|---|---|---|
| 436,514 | Wiegand | Sept. 16, 1890 |
| 1,746,661 | Legg | Feb. 11, 1930 |
| 1,906,803 | Mueller | May 2, 1933 |
| 1,960,090 | Replogle | May 22, 1934 |
| 2,059,159 | Whitaker et al. | Oct. 27, 1936 |
| 2,312,888 | Everest | Mar. 2, 1943 |
| 2,455,763 | Harrison | Dec. 7, 1948 |
| 2,475,148 | Massa (B) | July 5, 1949 |
| 2,476,778 | Smoluchowski | July 19, 1949 |
| 2,496,484 | Massa | Feb. 7, 1950 |
| 2,499,110 | Rich | Feb. 28, 1950 |
| 2,534,846 | Ambrose et al. | Dec. 19, 1950 |
| 2,560,430 | Friend | July 10, 1951 |
| 2,667,104 | Buck | Jan. 26, 1954 |

FOREIGN PATENTS

| | | |
|---|---|---|
| 614,498 | Germany | June 11, 1935 |

OTHER REFERENCES

Journal of the Optical Society of America and Review of Scientific Instruments, vol. 14, May 1927, "Some Experimental Methods in Magnetostriction," by S. R. Williams, pages 391–394.